(12) United States Patent
Malik et al.

(10) Patent No.: US 7,555,172 B2
(45) Date of Patent: Jun. 30, 2009

(54) DYNAMIC RANGE DETECTION AND ADJUSTMENT

(75) Inventors: Ammal Malik, Webster, NY (US); Xing Li, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 668 days.

(21) Appl. No.: 11/263,249

(22) Filed: Oct. 31, 2005

(65) Prior Publication Data

US 2007/0098262 A1    May 3, 2007

(51) Int. Cl.
*G06K 9/32* (2006.01)
(52) U.S. Cl. .................. 382/300; 382/163; 382/164; 358/515; 358/518
(58) Field of Classification Search ............. 382/164, 382/167, 169, 282, 300; 358/515, 518, 529
See application file for complete search history.

(56) References Cited

U.S. PATENT DOCUMENTS

| | | | |
|---|---|---|---|
| 5,282,061 A | 1/1994 | Farrell | |
| 5,751,848 A | 5/1998 | Farrell | |
| 5,790,715 A * | 8/1998 | Iizuka | 382/309 |
| 5,815,605 A * | 9/1998 | Koike | 382/269 |
| 5,881,166 A | 3/1999 | Farrell | |
| 6,129,457 A * | 10/2000 | Thompson et al. | 358/1.2 |
| 6,198,845 B1 | 3/2001 | Tse et al. | |
| 6,208,753 B1 * | 3/2001 | Braudaway et al. | 382/162 |
| 6,438,265 B1 | 8/2002 | Heilper | |
| 6,611,632 B1 * | 8/2003 | Tomiyama et al. | 382/300 |
| 6,674,899 B2 | 1/2004 | Nagarajan et al. | |
| 6,738,496 B1 | 5/2004 | Van Hall | |
| 7,064,859 B1 * | 6/2006 | Dittrich et al. | 358/1.9 |

* cited by examiner

*Primary Examiner*—Yosef Kassa
(74) *Attorney, Agent, or Firm*—Fay Sharpe LLP

(57) ABSTRACT

An original image is received. The original image is divided into tiles. A whitepoint value of each tile is determined. A blackpoint value of each tile is determined. A whitepoint value of each pixel in the image is determined by interpolating the determined whitepoint values of neighboring tiles. A blackpoint of each pixel in the image is determined by interpolating the determined blackpoint values of neighboring tiles.

29 Claims, 5 Drawing Sheets

DYNAMIC RANGE DETECTION AND ADJUSTMENT

BACKGROUND

The following relates to document processing systems. It finds particular application in conjunction with background detection and suppression and will be described with a particular reference thereto. However, it is to be appreciated that the following is also amenable to other like applications.

Typically, in a digital reproduction device, a document or image is scanned by a digital scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image.

Sometimes the white regions of the original image are not imaged as white regions in the produced document. Typically, digital scanning and multifunction devices provide the function of automatic background suppression to make white regions in the original white on scanned images or copies. Background detection is important for correct application of suppression techniques. For example, the mistakes in dynamic range detection could result in defects ranging from loss of highlight or shadow details to residual dots in white background.

One particular problem arises in pasted documents. For example, each of the documents, which are pasted together, could have a different background as an original. The likelihood of making mistakes in dynamic range detection in pasted documents is increased. Another particular problem arises in wide format scanners and documents. The size of some documents, such as 36" wide x 100' long, might make the background in the rendered image substantially non-uniform throughout the rendered document. In most cases, there is not enough contrast between the background and the foreground text.

One approach to detect the background pixels is to use the traditional lead edge based background detection methods as, for example, described in U.S. Pat. No. 6,198,845 to Tse, identified below. However, such methods may produce numerous mistakes. Another approach to detecting background value of a document is to use full page background detection approaches as described in U.S. Pat. No. 6,674,899 to Nagarajan, identified below. But, the full page background detection of the wide format documents is problematic with such methods due to the size of the documents and hence high costs.

The alternative approach is a manual background detection in which a user or an operator checks the background and selects an appropriate suppression mechanism. However, such technique is time consuming, user "unfriendly", and is unreliable as it depends on user's perception of the image.

There is a need for methods and apparatuses that overcome the aforementioned problems and others.

REFERENCES

U.S. Pat. No. 5,282,061 to Farrell, entitled "Programmable apparatus for determining document background level," issued Jan. 25, 1994, describes an apparatus for efficiently determining the background level of an image, based upon a sampling of the image, during processing of the image signals and without the need for a prior scan operation.

U.S. Pat. No. 5,751,848 to Farrell, entitled "System and method for generating and utilizing histogram data from a scanned image," issued May 12, 1998, describes a system and method for determining a black threshold grey value for an image.

U.S. Pat. No. 5,881,166 to Farrell, entitled "Method and system for generating a histogram of a scanned image," issued Mar. 9, 1999, describes a system and method which generates a histogram of a scanned image by determining a number of pixels of the image to be scanned to generate the histogram.

U.S. Pat. No. 6,198,845 to Tse, entitled "Method for determining document background for adjusting the dynamic range of an image of the document," issued Mar. 6, 2001, describes determining the background grey-level of a document based on the lead-edge of the document.

U.S. Pat. No. 6,674,899 to Nagarajan, entitled "Automatic Background Detection of Scanned Documents," issued Jan. 6, 2004, describes a full page background detection method for generating a background statistics that distinguishes between gray level information from document areas and non-document areas.

U.S. Pat. No. 6,438,265 to Heilper, entitled "Method of binarization in an optical character recognition system," issued Aug. 20, 2002, describes a method of binarization used in an OCR system involves in determining text pixels by checking, for each pixel, that the difference between its value and the values of a plurality of pixels located at a predetermined distance therefrom is greater than a relative threshold corresponding to the difference in intensities between the text and the background of the image, subsampling the image at a rate corresponding to at least two pixels in order to detect kernels of text, and then binarizing the image pixels only in tiles of several stroke width sides containing text kernels by using in each tile, an absolute threshold estimated in that tile.

U.S. Pat. No. 6,738,496 to Van Hall, entitled "Real time binarization of gray images," issued May 18, 2004, describes a binarization method for gray address images which combines high quality and high speed.

However, these references do not discuss full page background detection and adjustment for paste up and wide format documents at a reasonable cost and performance.

BRIEF DESCRIPTION

According to one aspect, a method is disclosed. An original image is received. The original image is divided into tiles. A whitepoint value of each tile is determined. A blackpoint value of each tile is determined. A whitepoint value of each pixel in the image is determined by interpolating the determined whitepoint values of neighboring tiles. A blackpoint of each pixel in the image is determined by interpolating the determined blackpoint values of neighboring tiles.

According to one aspect, a method is disclosed. An original image is received. A whitepoint value of each pixel in the image is determined. A blackpoint of each pixel in the image is determined. Grayscale value of each pixel of the original image is adjusted based at least on one of the determined pixel whitepoint and blackpoint value.

In accordance with another aspect, a document processing system is disclosed. A document processing device produces an original image. A tile determining device divides the original image into tiles. A tile whitepoint and blackpoint determining device determines a whitepoint value and a blackpoint value of each tile. A whitepoint map determining device determines a whitepoint value of each pixel in the image by interpolating the determined whitepoint values of neighboring tiles. A blackpoint map determining device determines a blackpoint value of each pixel in the image by interpolating the determined blackpoint values of neighboring tiles.

In accordance with another aspect, a document processing system is disclosed. A document processing device produces an original image. A whitepoint map determining device determines a whitepoint value of each pixel in the image. A blackpoint map determining device determines a blackpoint value of each pixel in the image. A dynamic range adjustment device adjusts the grayscale value of each pixel of the original image based at least on one of the determined pixel whitepoint and blackpoint values.

In accordance with another aspect, a document processing system is disclosed. An original grayscale image is produced. A processor is programmed to performed the steps of: dividing the original image into tiles, determining a whitepoint value of each tile, determining a whitepoint value of each pixel in the image by interpolating the determined whitepoint values of neighboring tiles, determining a blackpoint value of each tile, determining a blackpoint value of each pixel in the image by interpolating the determined blackpoint values of neighboring tiles, and adjusting the grayscale value of each pixel of the original image based at least on one of the determined pixel whitepoint and blackpoint value.

DETAILED DESCRIPTION

Figure 1:
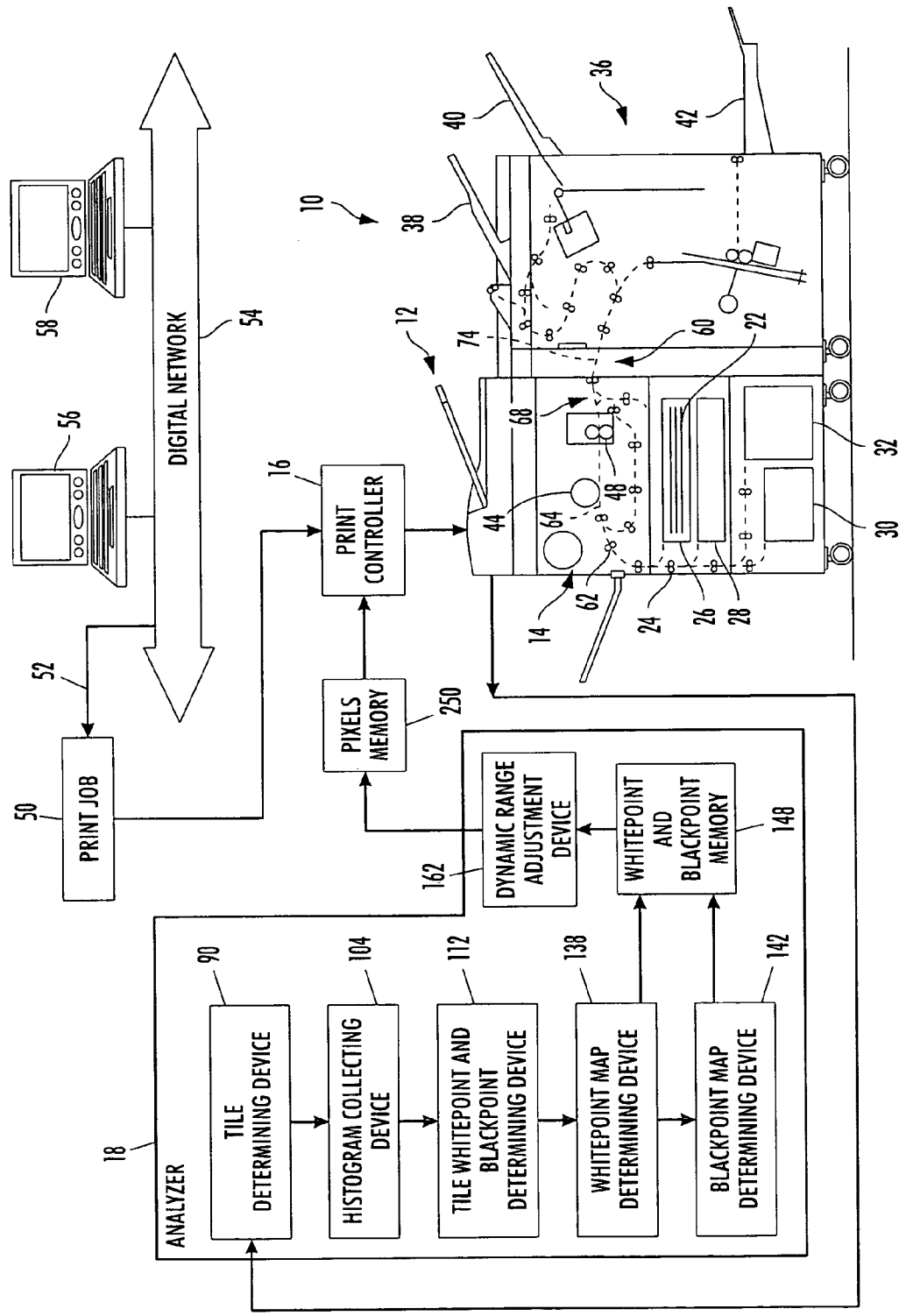
FIG. 1 is a diagrammatic illustration of a document processing system.

With reference to FIG. 1, a printing or document processing system 10 includes an image input device 12 such as a scanner, a printer such as a printing or marking engine or printer 14, and a printer or system controller 16, all interconnected by links. The links can be wired or wireless links or other means capable of supplying electronic data to and/or from the connected elements. Exemplary links include telephone lines, computer cables, ISDN lines, and the like. The image input device 12 may include conversion electronics for converting the image-bearing documents to image signals or pixels or such function may be assumed by the marking engine 14. As described in detail below, an analyzer or processor 18 determines white and blackpoint values of each pixel in the image and applies suppression or adjustment algorithms to the pixels of the image based on the determined white and blackpoint values of each pixel in the image.

With continuing reference to FIG. 1, the marking engine 14 is fed with a print media or sheet or sheets 22 from a respective print media feeding source 24 such as a paper feeder including one or more print media sources or paper trays 26, 28, 30, 32. Each of the print media sources 26, 28, 30, 32 can store sheets of the same type of print media, or can store different types of print media. For example, the print media sources 26, 28 may store the same type of large-size paper sheets, print media source 32 may store company letterhead paper, and the print media source 30 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 36 including one or more finishing output destinations 38, 40, 42 such as trays, stackers, pans, etc. The marking engine 14 includes an imaging component 44 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbelts, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

An original document or image or print job or jobs 50 can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10.

Alternatively, the print jobs 50 can be electronically delivered to the printer controller 16 of the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system or network or highway 60 links the print media source 24, printer 14 and finisher 36. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 24 is delivered to the printer 14 by a pathway 64 which is common to the trays 26, 28, 30, 32. The print media is printed by the imaging component 44 and fused by the fuser 48. A pathway 68 from the printer 14 merges into a pathway 74 which conveys the printed media to the finisher 36.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

In one embodiment, the document processing system 10 is a network scanning engine. More specifically, the input documents are scanned in by the scanner 12, processed by the analyzer or processor 18, and exported over to some file repository or user's electronic mail (e-mail) via the digital network 54.

Figure 2:
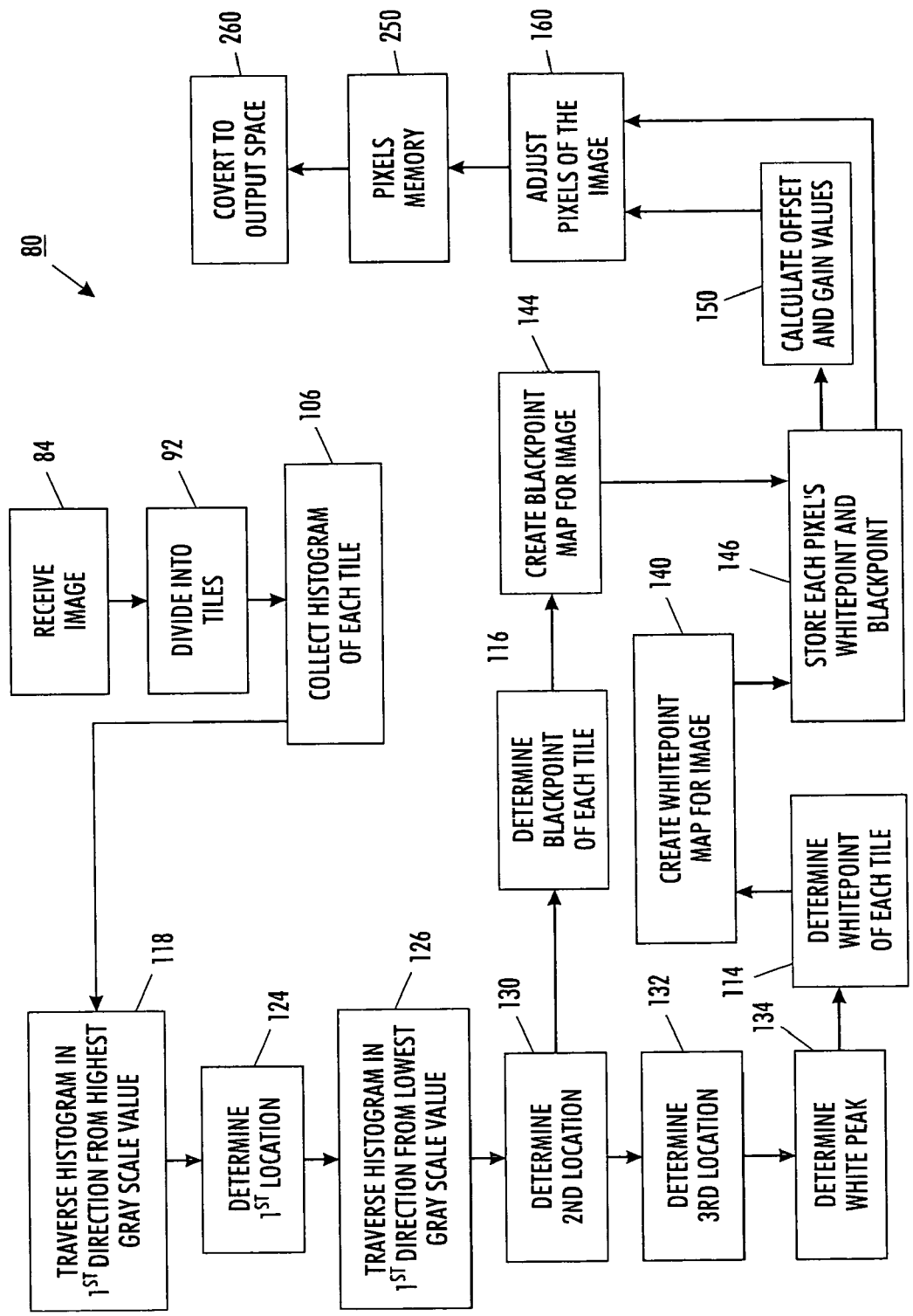
FIG. 2 is a block diagram of a control methodology approach.
Figure 3:
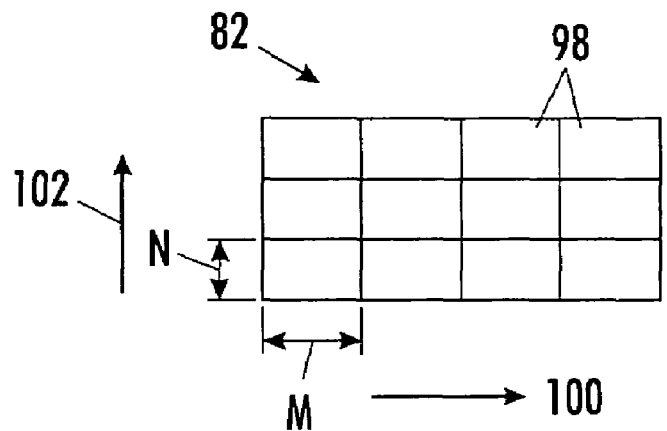
FIG. 3 is a diagrammatic illustration of the tiling of an image.
Figure 4:
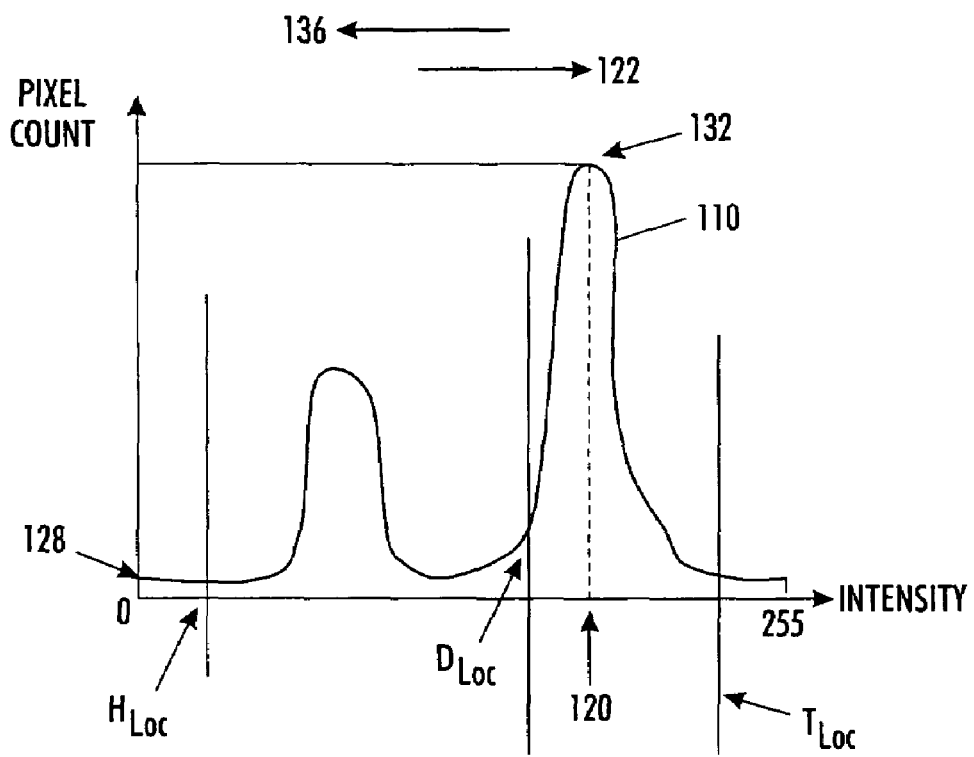
FIG. 4 is an illustration of a histogram.

With continuing reference to FIG. 1 and further reference to FIGS. 2, 3 and 4, a control methodology approach 80 controls background determination and suppression in the document processing system 10. A sample image 82 is received 84 by the document processing system 10. For example, the sample image 82 is scanned by the scanner 12 to generate a digital representation of the scanned sheet. A tile determining device or processor or algorithm 90 divides 92 the image 82 into subimages or tiles or windows 98 of size M×N where M is the number of pixels in a cross-process direction 100 and N is the number of scanlines in each tile 98 in a process direction 102. A histogram collecting device or processor or algorithm 104 collects 106 a histogram 110 separately for each tile 98. A tile whitepoint and blackpoint determining device or processor or algorithm 112 determines a whitepoint value $P_{white\_T}$ 114 and a blackpoint value $P_{blk\_T}$ 116 of each tile 98.

More specifically, the histogram 110 is traversed 118 from the highest grayscale value 120 in a first or increasing grayscale values direction 122 and a grayscale value of a tail or first location is determined 124. More specifically, as the histogram 110 is being traversed in the first direction 122, tailcount intensity values $T_C$ are being accumulated. Each tailcount intensity value $T_C$ is compared to a first threshold $T_{H1}$, which is, for example a programmable parameter such as 250, 251, 252, or any other appropriate value. When the tailcount value $T_C$ is greater than or equal to the first threshold $T_{H1}$, the tail location grayscale value $T_{Loc}$ is recorded. The histogram 110 is traversed 126 in the first direction 122 from the lowest grayscale value 128. A grayscale value of a head or second location $H_{LOC}$ is determined 130. More specifically, as the histogram 110 is being traversed, the headcount intensity values $H_C$ are being accumulated. Each headcount intensity value $H_C$ is compared to a second threshold $T_{H2}$. When the headcount intensity value $H_C$ is greater than or equal to the second threshold $T_{H2}$, the head location grayscale value $H_{LOC}$ is recorded. A grayscale value of a third or difference location $D_{LOC}$ is determined 132 by multiplying a difference between the grayscale values of the first and second locations $T_{LOC}$, $H_{LOC}$ by a programmable parameter $T_{LOCP}$. A value of a white peak $P_{peak}$ of each tile 98 or the highest histogram value is determined 134 by traversing the histogram 110 from the first location $T_{LOC}$ to the third location $D_{LOC}$ in a second or decreasing grayscale values direction 136.

The whitepoint $P_{WHITE\_T}$ of each tile 98 is set as:

$$P_{WHITE\_T} = \max(P_{peak} - \text{offset1}, T_{LOC} - \text{offset2}), \text{ where}$$

$P_{WHITE\_T}$ is the grayscale value of the whitepoint of the tile;
$P_{peak}$ is the grayscale value of the white peak;
$T_{LOC}$ is the grayscale value of the tail location;
offset1 is the white peak grayscale value offset; and
offset2 is the tail location grayscale value offset.

The blackpoint $P_{BLK\_T}$ of each tile 98 is set as:

$$P_{BLK\_T} = H_{LOC} + \text{offset3}, \text{ where}$$

$P_{BLK\_T}$ is the grayscale value of the blackpoint of the tile;
$H_{LOC}$ is the grayscale value of the head location; and
offset3 is the head location grayscale value offset.

If the determined blackpoint value of the tile $P_{BLK\_T}$ is outside a pre-defined range, the boundary or default value is used as the tile blackpoint value. For example, the default blackpoint value is assigned based on the user selection of the input document type—photograph, mixed, or text.

A whitepoint map determining device or processor or algorithm 138 creates 140 whitepoint map for each pixel in the image 82 in real-time by interpolating the determined whitepoint values of neighboring tiles, for example, of four neighboring tiles. Alternatively, for nearest neighbor interpolation, the same whitepoint is used for each of the pixels in the tile 98. A blackpoint map determining device or processor or algorithm 142, similarly to the whitepoint map, creates 144, a blackpoint map based on the blackpoint values detected for each tile 98. Whitepoint and blackpoint values for each pixel are stored 146 in a whitepoint and blackpoint memory 148. The whitepoint and blackpoint values of each pixel are used to calculate 150 the offset and gain values on a pixel by pixel basis.

In this manner, the robustness of dynamic range detection is improved by detecting the whitepoint value and the blackpoint value for each pixel in the image. The grayscale pixel value of the tail location in the histogram 110 is used in judging the validity of the white peak as well as in deriving the final whitepoint of the tile 98. Similarly, the grayscale pixel value of the head location in the histogram 110 is used in determining the blackpoint value of the tile 98.

Figure 5:
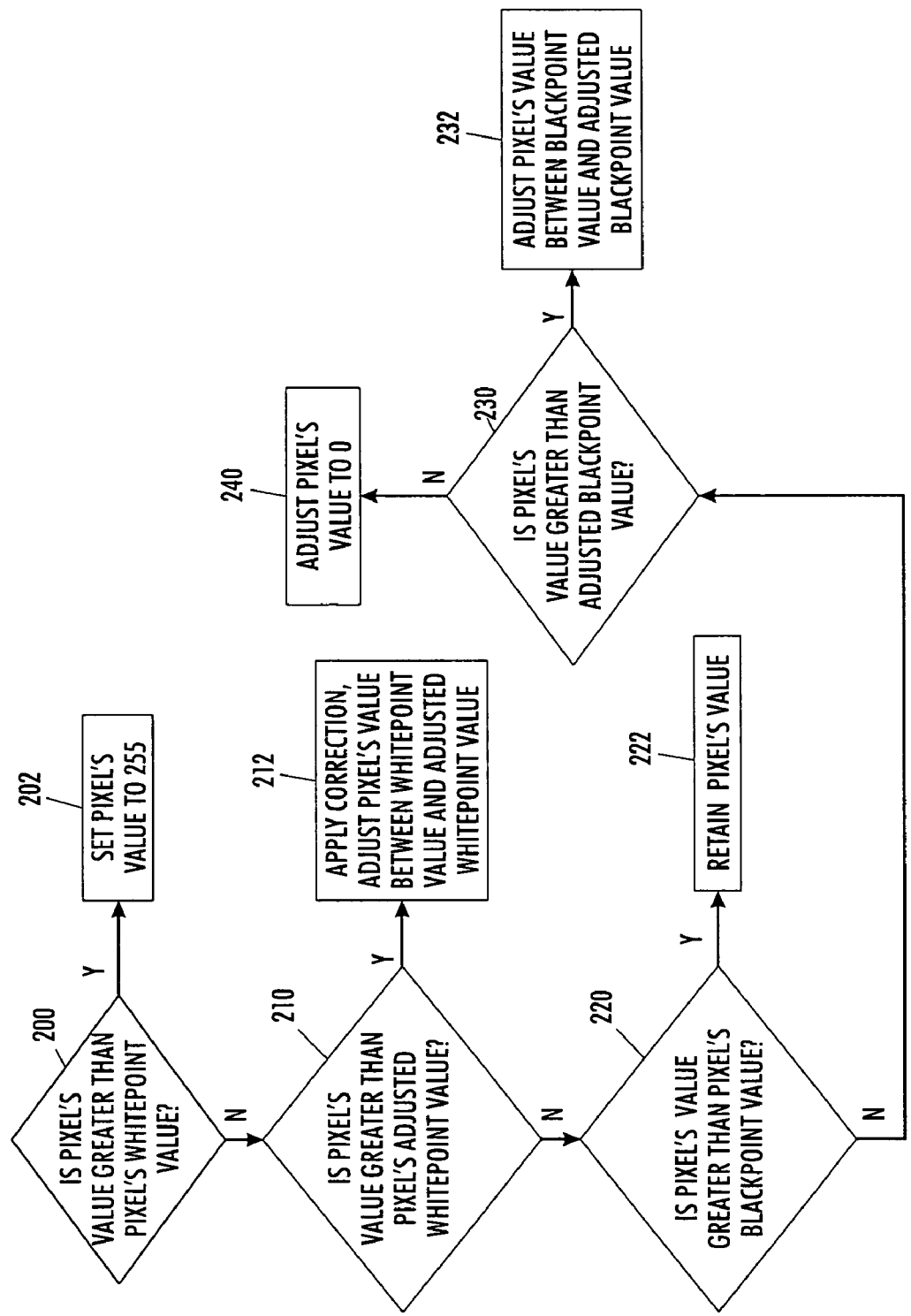
FIG. 5 is a block diagram of a portion of a control methodology approach.
Figure 6:
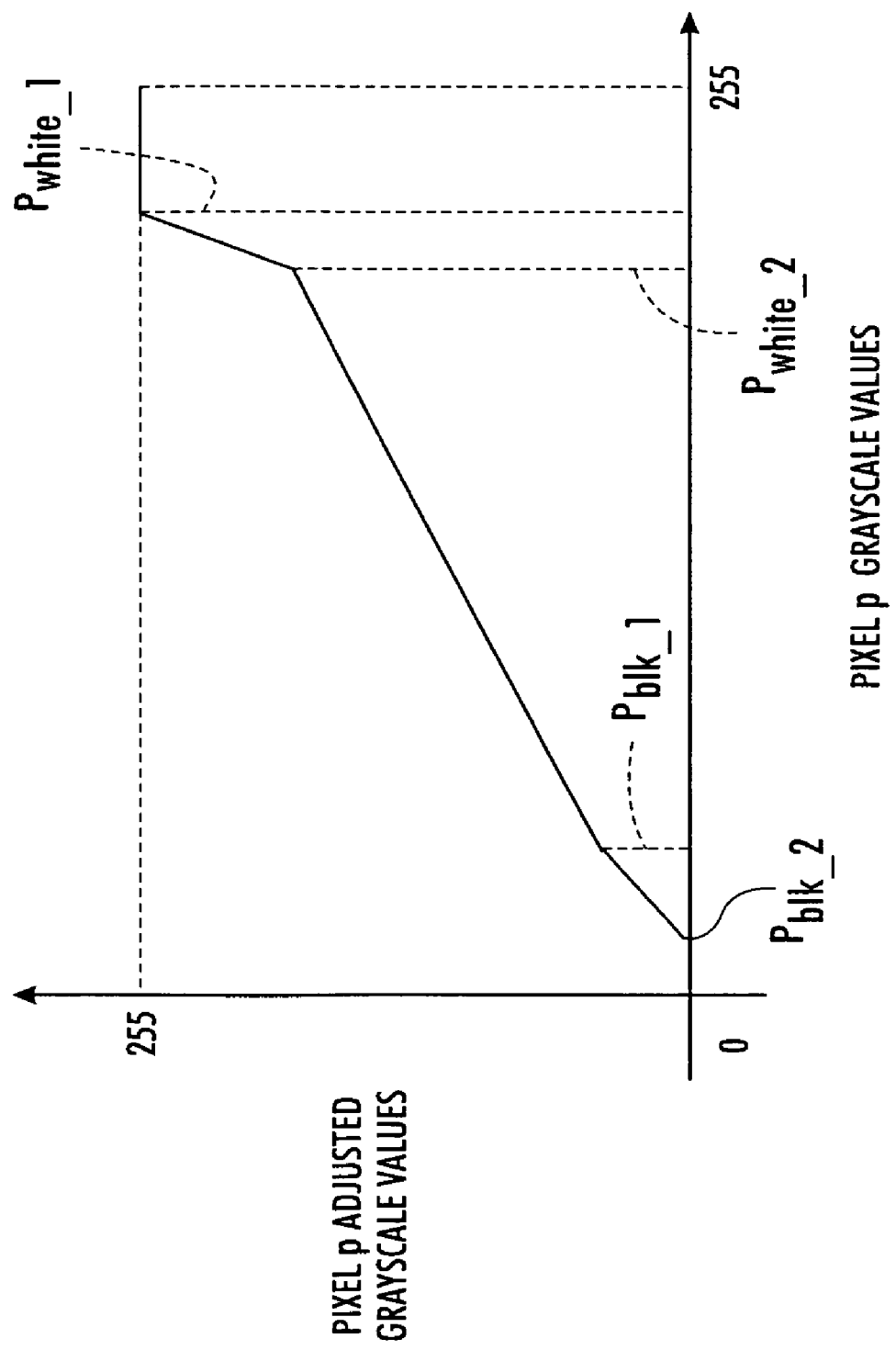
FIG. 6 is an example of luminance adjustment curve.

With continuing reference to FIG. 1 and further reference to FIGS. 5 and 6, a dynamic range adjustment device or algorithm or processor 162 adjusts pixels in the image 82 in accordance with a set of rules. For example, in step 200, the pixel's p grayscale value is compared to the determined pixel's p whitepoint value $P_{white\_1}$. If the pixel's p grayscale value is greater than the pixel's p whitepoint value $P_{white\_1}$, the pixel's p value is set 202 to 255. If the pixel's p grayscale value is less than or equal to the pixel's p whitepoint value $P_{white\_1}$, in step 210, the pixel's p value is compared to an adjusted whitepoint value $P_{white\_2}$. The adjusted whitepoint value $P_{white\_2}$ of the pixel p is calculated as a product of the pixel's p whitepoint value $P_{white\_1}$ and a predetermined constant $C_{white}$. If the gray level value of the pixel p is greater than the adjusted whitepoint value $P_{white\_2}$, a gain and/or offset correction is applied 212 to the pixel p value so that the adjusted pixel's p value is less than or equal to the whitepoint value $P_{white\_1}$ and greater than the adjusted whitepoint value $P_{white\_2}$. If the gray level value of the pixel p is less than or equal to the adjusted whitepoint value $P_{white\_2}$, in step 220, the pixel's p grayscale value is compared to the pixel's p blackpoint value $P_{blk\_1}$. If the pixel's p grayscale value is greater than the pixel's p blackpoint value $P_{blk\_1}$, the original grayscale value of the pixel p is retained 222. In step 230, the pixel's p grayscale value is compared to an adjusted blackpoint value $P_{blk\_2}$. The adjusted blackpoint value $P_{blk\_2}$ of the pixel p is calculated as a product of the pixel's p blackpoint value $P_{blk\_1}$ and a predetermined second constant $C_{blk}$. If the gray level value of the pixel p is greater than the adjusted blackpoint value $P_{blk\_2}$, the grayscale value of the pixel p is adjusted or suppressed 232 based on the pixel's p blackpoint value $P_{blk\_1}$ and adjusted blackpoint value $P_{blk\_2}$ so that the adjusted pixel's p grayscale value is less than or equal to the pixel's p blackpoint value $P_{blk\_1}$ and greater than the pixel's p adjusted blackpoint value $P_{blk\_2}$. If the gray level value of the pixel p is less than or equal to the adjusted blackpoint value $P_{blk\_2}$, the grayscale value of the pixel p is set 240 to 0.

With continuing reference to FIG. 1 and reference again to FIG. 2, adjusted and non-adjusted pixels are stored in a pixels memory 250. A printer controller 16 converts the pixels of the image 82 into an output space 260.

In one embodiment, the dynamic range adjustment technique described above is adjusted to account for greater noise in the document. For example, in the step 200, the determination is made whether the gray level value of the pixel p is less than the pixel's p whitepoint value $P_{white\_1}$ by some marginal value or a third threshold $T_{H3}$. A number of pixels which gray level values are less than the respective whitepoint values $P_{white\_1}$ by a fourth threshold $T_{H4}$, is counted in the neighborhood of the pixel p. If the count is greater than m×n/factor, a different constant $C_{white\_2}$ is used to calculate the adjusted whitepoint value $P_{white\_2}$ of the pixel p. The dynamic range adjustment described above is then applied.

In this manner, by utilizing an automatic, adaptive technique for detecting the background level in the image and, based on the determined background level, applying the suppression technique, the different background levels of each paste up document in the resultant image are appropriately identified and suppressed. The methods described above substantially improve the dynamic range of the documents which do not have uniform background across the page and/or low contrast between the foreground and background images. As a result, the dynamic range of the document is adjusted, e.g., the background is correctly suppressed and contrast appropriately adjusted to make the text more readable.

The use of the above mentioned automatic dynamic range adjustment also helps to eliminate any noise in the scanned documents and eliminate non-uniformities in the scan and therefore reduces the file size of a scan2export job.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of processing image data for a document processing system, comprising:
   receiving a digital representation of an original image from an image input device, the digital representation including a plurality of pixels, each pixel having a grayscale value;
   dividing the digital representation into tiles, each tile including multiple pixels;
   creating a histogram for each tile based on the grayscale values of the multiple pixels in the corresponding tile;
   determining a whitepoint value of each tile based at least in part on the corresponding histogram;
   determining a blackpoint value of each tile based at least in part on the corresponding histogram;
   creating a whitepoint map by determining whitepoint values for each pixel in the digital representation by interpolating the determined whitepoint values of neighboring tiles and storing the whitepoint map in whitepoint memory; and
   creating a blackpoint map by determining blackpoint values for each pixel in the digital representation by interpolating the determined blackpoint values of neighboring tiles and storing the blackpoint map in blackpoint memory.

2. The method of claim 1, further including:
   determining a grayscale value of a tail location in each histogram;
   determining a grayscale value of a head location in each histogram;
   determining a grayscale value of a difference location in each histogram based at least in part on the grayscale values of the corresponding tail and head locations; and
   selecting a grayscale value of a white peak location in each histogram based at least in part on the grayscale values of the corresponding difference and tail locations.

3. The method of claim 2, wherein determining the tile whitepoint value of each tile further includes:
   determining the whitepoint value for the corresponding tile based at least in part on the greatest of an adjusted grayscale value of the white peak location of the corresponding tile and an adjusted grayscale value of the tail location of the corresponding tile.

4. The method of claim 2,-wherein determining the blackpoint value of each tile further includes:
   selecting a blackpoint value for the corresponding tile based at least in part on an adjusted grayscale value of the head location of the corresponding tile.

5. The method of claim 4, wherein determining the blackpoint value of each tile further includes:

comparing the determined blackpoint value for the corresponding tile to a predefined range and one of:
retaining the determined blackpoint value if the determined blackpoint value within the predefined range; and
resetting the blackpoint value to a default value if the determined blackpoint value is outside the predefined range.

6. The method of claim 1, further including:
adjusting the grayscale value of each pixel based at least in part on one of the determined whitepoint value and the determined blackpoint value for the tile with which the corresponding pixel is associated.

7. A document processing device for performing the steps of claim 1, comprising:
an image input device;
a processor in operative communication with the image input device;
a whitepoint memory in operative communication with the processor; and
a blackpoint memory in operative communication with the processor.

8. The method of claim 7, wherein the document processing device includes a xerographic marking engine.

9. The method of claim 7, wherein the document processing device includes a network scanning engine.

10. A method of processing image data for a document processing system, comprising:
receiving a digital representation of an original image from an image input device, the digital representation including a plurality of pixels, each pixel having a grayscale value;
dividing the digital representation into tiles, each tile including multiple pixels;
creating a histogram for each tile based on the grayscale values of the multiple pixels in the corresponding tile;
determining a whitepoint value of each pixel based at least in part on the corresponding histogram;
determining a blackpoint value of each pixel based at least in part on the corresponding histogram;
comparing the grayscale value of each pixel to at least one of the determined whitepoint value and the determined blackpoint value for the corresponding pixel; and
selectively adjusting the grayscale value of each pixel to form an adjusted representation of the original image based at least in part on the comparing and storing the selectively adjusted pixels in a pixel memory.

11. The method of claim 10, further including:
selectively assigning a constant grayscale value to individual pixels;
selectively assigning an adjusted grayscale value to individual pixels; and
selectively maintaining an original grayscale value of individual pixels.

12. The method of claim 10, further including:
comparing the grayscale value of each pixel to the determined whitepoint value of the corresponding pixel; and
based on the comparison, one of assigning a constant grayscale value to the corresponding pixel and calculating an adjusted whitepoint value for the corresponding pixel.

13. The method of claim 12, wherein the grayscale value of the corresponding pixel is greater than the determined whitepoint value of the corresponding pixel and further including:
assigning the grayscale value of the corresponding pixel to 255.

14. The method of claim 12, wherein the grayscale value of the corresponding pixel is not greater than the determined whitepoint value of the corresponding pixel and further including:
comparing the grayscale value of the corresponding pixel to the adjusted whitepoint value of the corresponding pixel; and
based on the comparison, one of i) adjusting the grayscale value of the corresponding pixel based at least in part on the determined whitepoint value of the corresponding pixel and the adjusted whitepoint value of the corresponding pixel and ii) comparing the grayscale value of the corresponding pixel to the determined blackpoint value of the corresponding pixel.

15. The method of claim 14, wherein the grayscale value of the corresponding pixel is greater than the adjusted whitepoint value of the corresponding pixel and further including:
adjusting the grayscale value for the corresponding pixel to a value less than or equal to the determined whitepoint value of the corresponding pixel and greater than the adjusted whitepoint value of the corresponding pixel.

16. The method claim 14, wherein the grayscale value of the corresponding pixel is not greater than the adjusted whitepoint value of the corresponding pixel and further including:
comparing the grayscale value of the corresponding pixel to the determined blackpoint value of the corresponding pixel; and
based on the comparison, one of retaining the grayscale value of the corresponding pixel and calculating an adjusted blackpoint value for the corresponding pixel.

17. The method of claim 16, wherein the grayscale value of the corresponding pixel is less than or equal to the determined blackpoint value of the corresponding pixel and further including:
comparing the grayscale value of the corresponding pixel to the adjusted blackpoint value of the corresponding pixel; and
based on the comparison, one of i) adjusting the grayscale value of the corresponding pixel based at least in part on the determined blackpoint value of the corresponding pixel and the adjusted blackpoint value of the corresponding pixel and (ii) assigning a constant grayscale value to the corresponding pixel.

18. The method of claim 17, wherein the grayscale value of the corresponding pixel is greater than the adjusted blackpoint value of the corresponding pixel and further including:
adjusting the grayscale value for the corresponding pixel to a value less than or egual to the determined blackpoint value of the corresponding pixel and greater than the adjusted blackpoint value of the corresponding pixel.

19. The method of claim 17, wherein the grayscale value of the corresponding pixel is not greater than the adjusted blackpoint value of the corresponding pixel and further including:
assigning the grayscale value of the corresponding pixel to 0.

20. The method of claim 16, wherein the grayscale value of the corresponding pixel is greater than the determined blackpoint value of the corresponding pixel and further including:
retaining the grayscale value of the corresponding pixel.

21. A document processing device for performing the steps of claim 10, comprising:
an image input device;
a processor in operative communication with the image input device; and
a pixel memory in operative communication with the processor.

22. A document processing system comprising:
  a document processing device for producing an original image;
  a tile determining device for dividing the original image into tiles;
  a tile whitepoint and blackpoint determining device for determining a whitepoint value and a blackpoint value of each tile;
  a whitepoint map determining device, which determines a whitepoint value of each pixel in the image by interpolating the determined whitepoint values of neighboring tiles;
  a blackpoint map determining device, which determines a blackpoint value of each pixel in the image by interpolating the determined blackpoint values of neighboring tiles; and
  a histogram collecting device for accumulating a histogram of grayscale values of pixels of each tile and wherein the tile whitepoint and blackpoint determining device is programmed to perform the steps of:
    determining a grayscale value of a tail location in the histogram;
    determining a grayscale value of a head location in the histogram;
    determining a grayscale value of a difference location which difference location grayscale value is greater than the head location grayscale value and less than the tail location grayscale value; and
    selecting a grayscale value located between the difference and tail location grayscale values as the tile whitepoint value.

23. The system of claim 22, wherein the tile whitepoint and blackpoint determining device is further programmed to perform the step of:
  selecting a grayscale value which is the greatest of one of an adjusted highest grayscale value of the tile and an adjusted grayscale value of the tail location as the whitepoint value of the tile.

24. The system of claim 22, wherein the tile whitepoint and blackpoint determining device is further programmed to perform the step of:
  selecting an adjusted grayscale value of the head location as the blackpoint point value of the tile.

25. The system of claim 22, further including:
  a dynamic range adjustment device for adjusting the grayscale value of each pixel of the original image based at least on one of the determined pixel whitepoint and blackpoint values.

26. The system of claim 22, wherein the document processing device includes a xerographic marking engine.

27. A document processing system comprising:
  a document processing device for producing a digital representation of an original image, the digital representation including a plurality of pixels, each pixel having a grayscale value;
  a tile determining device for dividing the digital representation into tiles, each tile including multiple pixels;
  a histogram collecting device for creating a histogram for each tile based on the grayscale values of the multiple pixels in the corresponding tile;
  a whitepoint map determining device, which determines a whitepoint value of each pixel based at least in part on the corresponding histogram;
  a blackpoint map determining device, which determines a blackpoint value of each pixel based at least in part on the corresponding histogram; and
  a dynamic range adjustment device for comparing the grayscale value of each pixel to at least one of the whitepoint value and the blackpoint value for the corresponding pixel and selectively adjusting the grayscale value of each pixel based at least in part on the comparing.

28. The system of claim 27, wherein the dynamic range adjustment device is also for:
  selectively assigning a constant grayscale value to individual pixels;
  selectively assigning an adjusted grayscale value to individual pixels; and
  selectively maintaining an original grayscale value of individual pixels.

29. A document processing system comprising:
  a document processing device for producing a digital representation of an original image, the digital representation including a plurality of pixels, each pixel having a grayscale value; and
  a processor for:
  i) dividing the digital representation into tiles, each tile including multiple pixels,
  ii) creating a histogram for each tile based on the grayscale values of corresponding pixels, iii) determining a whitepoint value of each tile based at least in part on the corresponding histogram,
  iv) creating a whitepoint map by determining whitepoint values for each pixel in the digital representation by interpolating the determined whitepoint values of neighboring tiles,
  v) determining a blackpoint value of each tile based at least in part on the corresponding histogram,
  vi) creating a blackpoint map by determining blackpoint values for each pixel in the digital representation by interpolating the determined blackpoint values of neighboring tiles, and
  vii) adjusting the grayscale value of each pixel based at least in part on one of the determined whitepoint value of the corresponding pixel and the determined blackpoint value of the corresponding pixel.

* * * * *